United States Patent [19]

Favreau et al.

[11] 4,337,514

[45] Jun. 29, 1982

[54] DEVICE FOR AUTOMATICALLY CONTROLLING THE TRANSFER FUNCTION OF A VIDEO SYSTEM FOR IMPROVING IMAGE PERCEPTION

[75] Inventors: Michel Favreau; Jean Bajon; Michel Cattoën; Serge Soca; Maurice Longuet; Christian Delattre, all of Paris, France

[73] Assignee: Thomson-CSF, Paris, France

[21] Appl. No.: 148,676

[22] Filed: May 12, 1980

[30] Foreign Application Priority Data

May 11, 1979 [FR] France ............................... 79 11991

[51] Int. Cl.³ ........................ H04N 3/00; G06F 15/36
[52] U.S. Cl. .................................... 364/515; 358/166; 364/553
[58] Field of Search .................. 364/515, 553; 358/37, 358/166, 284, 164, 169

[56] References Cited

U.S. PATENT DOCUMENTS

| | | | |
|---|---|---|---|
| 3,626,168 | 12/1971 | Norsworthy | 364/553 X |
| 3,708,693 | 1/1973 | Ferrier et al. | 358/164 X |
| 3,979,555 | 9/1976 | Opittek et al. | 358/166 X |
| 3,983,320 | 9/1976 | Ketcham et al. | 358/166 |
| 3,996,421 | 12/1976 | Pruznick et al. | 358/166 |
| 4,214,271 | 7/1980 | Jones et al. | 358/166 |

Primary Examiner—Jerry Smith

[57] ABSTRACT

The device comprises a variable-characteristic nonlinear four-terminal network having one input for receiving a video signal $V_e$ and eight inputs for controlling transfer parameters. Statistical analysis of the amplitude of the signal $V_e$ permits acquisition of the luminance distribution function of said signal. On the basis of this distribution function, computing means determine the values of the transfer parameters to be applied to the control inputs of the four-terminal network in order to deliver at the output of the network a video signal $V_s$ which extends over the entire luminance scale and has the desired distribution for satisfying optimum conditions of vision.

5 Claims, 2 Drawing Figures

DEVICE FOR AUTOMATICALLY CONTROLLING THE TRANSFER FUNCTION OF A VIDEO SYSTEM FOR IMPROVING IMAGE PERCEPTION

This invention relates to devices for controlling the transfer function of a video system in such a manner as to ensure that an image containing the maximum amount of information may thus be obtained at the receiver.

It is known that, in order to obtain a faithful reproduction of the image to be transmitted, a nonlinear four-terminal network must be inserted in the video chain between the analyzer and the synthesizer, thus making it possible to linearize the generalized transfer function of the video system since the pickup tube sometimes has a nonlinear characteristic whilst the image reproducer is always nonlinear.

The user has the possibility of adjusting the transfer characteristic of his television receiver as a function of local illumination in order to make the received image more readily perceptible.

This adjustment enables the user to modify the transfer characteristic of the television receiver at will but is nevertheless subject to a disadvantage in that it permits only one identical adjustment for all images whereas each picture pickup condition would entail the need for a different adjustment in order to improve image perceptibility. This adjustment is not automatic.

A preliminary correction can also be made at the camera end. The operators have in fact certain adjustments at their disposal: black level, white level (lens aperture stop) as well as modification of the amplitude transfer function in some instances, that is to say either to the full extent over the entire half-tone scale (gamma) or to a partial extent in the vicinity of black ("black stretch"). The modifications are either made by hand as desired by the camera operator or automatically as a function of the output current of the pickup tube (automatic diaphragm).

By reason of the display conditions, however, optimum perception of useful information as a function of the picture pickup conditions is not achieved even in this case.

Another method consists to effect a histogram equalization. All known structures designed for applying this method are digital ones, they determine an important loss of informations.

A more elaborate device is therefore necessary and this is the aim of the present invention.

According to the invention, there is provided a device for automatically controlling the transfer function of a video system, comprising a non linear four-terminal network having one input for receiving a video signal $V_e$, one output for delivering a corrected signal $V_s$ equal to $FV_e$ where F is the transfer function of the four-terminal network defined by n parameters (n being a positive whole number) and n control inputs for controlling the values of the n parameters, means for acquisition of the luminance distribution by statistical analysis of the video signal $V_e$ having one output, means for computing the luminance cumulative distribution function of the signal $V_e$ having one input coupled to the output of the means for acquisition of luminance distribution and one output, and means for computing the values of the parameters to be applied to the control inputs of the four-terminal network so as to ensure that the video signal $V_s$ produced extends over the scale of luminances in a predetermined distribution having one input coupled to the output of the means for computing the distribution function and n outputs coupled to the n control inputs of the four-terminal network.

These and other features of the invention will be more apparent upon consideration of the following description and accompanying drawings, wherein.

The corresponding elements which are identical in both figures are designated by the same references. Furthermore, precise synchronization devices relating to current technology have been omitted from the drawings for the sake of enhanced clarity and simplification of the description.

Figure 1:
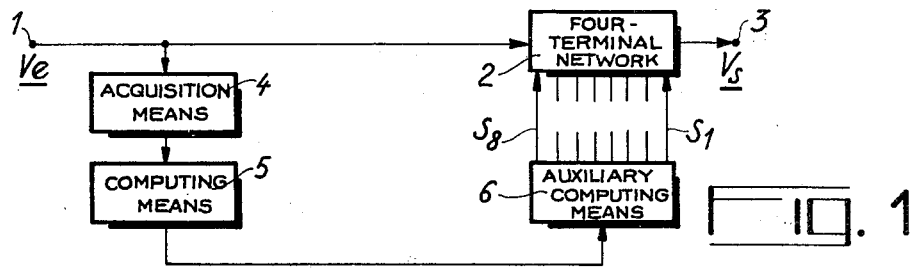
FIG. 1 is a block diagram of an automatic control device according to the invention.

In FIG. 1, an input terminal 1 which receives a video signal $V_e$ is coupled to an output terminal 3 through a variable-characteristic nonlinear four-terminal network 2 having eight inputs $S_1$ to $S_8$ for controlling the values of the transfer parameters. Said four-terminal network is of the known type having a broken-line transfer function constituted by a predetermined number of linear segments.

In the example herein described, the four-terminal network has been chosen so as to have eight variable-transfer parameters, namely four threshold and gain pairs corresponding to four segments. A four-terminal network of this type comprises four threshold amplifiers in which no signal is transmitted below the threshold and in which the signals are transmitted with a desired gain above said threshold.

Thus the four-terminal network 2 delivers at the output terminal 3 a corrected video signal $V_s$ equal to $F \cdot V_e$, where F is the transfer function of the four-terminal network; said signal $V_s$ is produced by the sum of the four output signals of the amplifiers.

The invention consists in automatically controlling the values of the transfer parameters in order to obtain a corrected signal $V_s$ in which the distribution of the amplitudes of the luminance signal is such as to correspond to optimum vision conditions irrespective of the picture pickup conditions. An equal distribution of the histogram of the amplitudes of the luminance signal is chosen in the example herein described.

This result is obtained when the transfer function F is equal to the luminance-signal amplitude cumulative distribution function. The elements of FIG. 1 shown in detail in FIG. 2 which will now be described below make it possible to obtain the values of the eight transfer parameters to be applied to the eight control inputs of the four-terminal network in order to obtain a transfer function F which is an approximation in segments of said cumulative distribution function.

There is also shown in FIG. 1 the input terminal 1 to which the video signal $V_e$ is applied, said terminal being connected to the input of acquisition means 4. The design function of said means 4 is to perform statistical analysis of amplitude distribution of 60,000 samples of the luminance signal among 32 given amplitude levels. The 60,000 samples result from the analysis of 60,000 regions which cover an entire image and the thirty-two amplitude levels are distributed at uniform intervals over the entire luminance amplitude scale or in other words from black to white. The means 4 therefore permit acquisition of the representative function of the histogram (number of samples in respect of each of the thirty-two levels contemplated). Computing means 5 connected to the output of the means 4 compute the integral of said function; by definition, this integral is the cumulative distribution function of the amplitude levels of the samples.

On the basis of said cumulative distribution function, auxiliary computing means 6 having one input connected to the output of the means 5 and eight outputs $S_1$ to $S_8$ connected respectively to the eight control inputs of the nonlinear four-terminal network 2 compute the values of the eight transfer parameters $A_1$ to $A_4$ and $G_1$ to $G_4$ to be applied to the control inputs, whilst $A_i$ and $G_i$ (i being variable from 1 to 4) represent respectively the values of threshold and gain of the amplifiers of the four-terminal network. These calculated values are such that the resultant transfer function F is an approximation in segments of the cumulative distribution function computed by the means 4.

Figure 2:
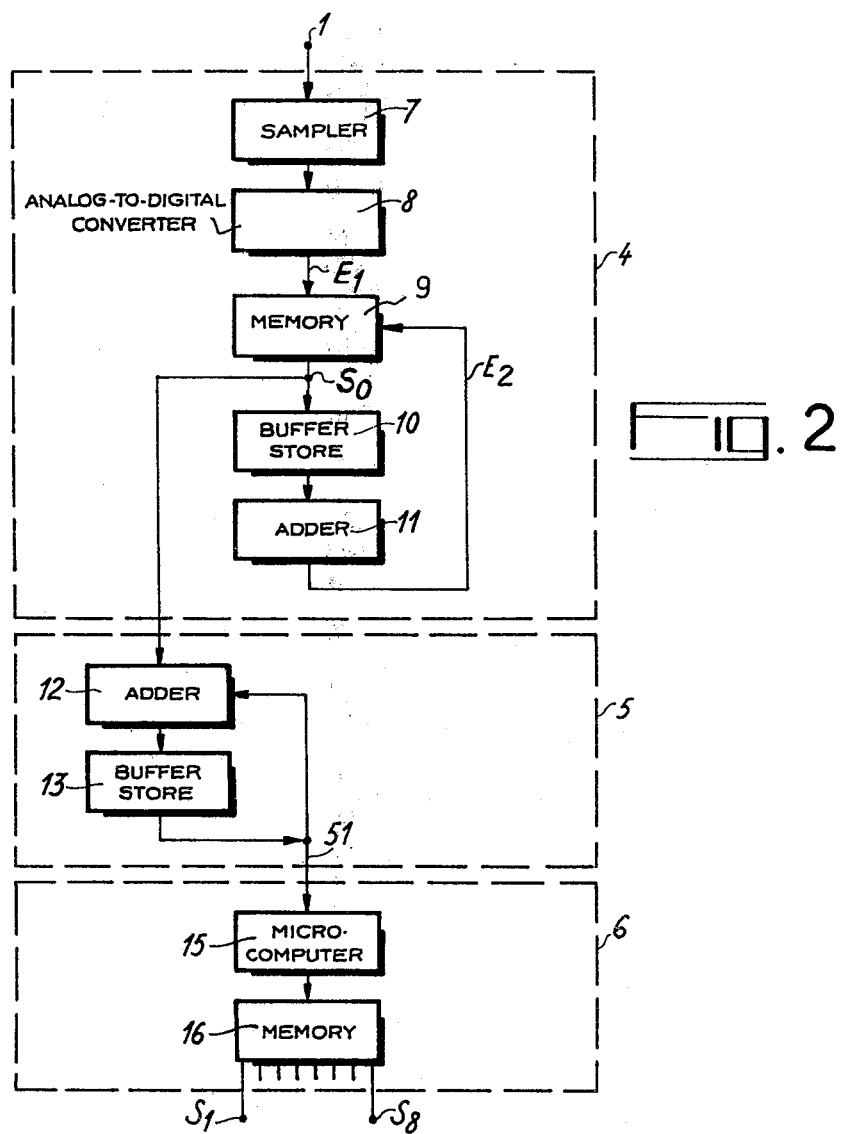
FIG. 2 is a preferred embodiment of elements of the device shown in FIG. 1.

In order that the operation of the device may be more clearly understood, the elements 4, 5 and 6 of FIG. 1 are shown in detail in FIG. 2.

There is shown in this figure a sampler 7 which couples the input terminal 1 to an analog-to-digital converter 8, one output of which is connected to an addressing input $E_1$ of the memory 9. In addition, said memory 9 has an output $S_0$ and a data input $E_2$ which are coupled to each other through a buffer store 10 in series with an adder 11. The output $S_0$ of said memory 9 is also connected to a first input of an adder 12; this input corresponds to the input of the computing means 5. A second input and the output of said adder 12 are coupled respectively to the input 51 of a microcomputer 15 included in the computing means 6 and to the same input 51 through a buffer store 13.

The output of said microcomputer 15 is coupled to the input of a memory 16. Said memory 16 has eight outputs $S_1$ to $S_8$ corresponding to the eight outputs of the computing means 6.

The operation of the device in accordance with the embodiment shown in FIGS. 1 and 2 is as follows:

The analog data corresponding to the video signal $V_e$ and received at the input terminal 1 are sampled by the sampler 7 and converted to binary signals by the analog-to-digital converter 8.

Thus in the example described, the video signal $V_e$ resulting from analysis of an image is sampled in 60,000 regions in accordance with a clock signal H.

The amplitude level of the luminance signal of each region is coded on a 32-level scale.

In the case of each sample, the converter delivers a five-bit binary number which characterizes the level of the amplitude of the luminance signal of the region considered. The values of these bits are applied in parallel to the addressing input $E_1$ of the memory 9 which has thirty-two memory compartments having a capacity equal to the number of regions and the content of which is reset to zero at the beginning of each sampled image.

In the case of a given region having an amplitude level k (where k is a positive whole number between 1 and 32), the binary number delivered by the converter initiates storage of the content of the corresponding compartment k in the memory 10.

At the time of appearance of the trailing edge of the clock signal H, the value stored in said memory 10 is incremented by one unit by the adder 11 and the new value is stored in the compartment k of the memory 9.

At the end of a sampled image, the memory 9 contains in each of its memory compartments the number of samples of the luminance signal in respect of each of the thirty-two luminance amplitude levels, which corresponds to the histogram of luminances.

There will now be described the means 5 employed for computing the integral of the function which is representative of the histogram contained in the memory 9.

At the end of a sampled image, the microcomputer initiates a cycle for serial reading of the compartments of the memory 9 which is completed before the beginning of the following image.

Each content of the compartments of the memory 9 is transferred into the microcomputer 15 through the means 5 constituted by the adder 12 associated with the buffer store 13 which operate as a digital integrator. This integrator delivers the values of the ordinates of the cumulative distribution function. On the basis of these values, the microcomputer 15 comprising a microprocessor MC6800 carries out a program of computation of the threshold values $S_1$ to $S_4$ and of the gain values $G_1$ to $G_4$ to be applied to the eight inputs of the four-terminal network 2.

These values are calculated according to the variations in slope of the distribution function so as to ensure that they control a transfer function of the four-terminal network which is a four-segment approach to the cumulative distribution function.

A transfer function of this type as defined by the computed parameters $S_1$ to $S_4$ and $G_1$ to $G_4$ converts the signal $V_e$ to a signal $V_s$ having an equally distributed luminance histogram, which corresponds to good vision conditions.

As can readily be understood, many alternative forms of construction can be substituted for the arrangements adopted in the example described in the foregoing.

In particular, the nonlinear four-terminal network can have any desired number of parameters in order that the transfer function may be better adapted to the cumulative distribution function; the same applies to the number of samples and to the number of amplitude levels of the luminance signal.

The foregoing is based on the assumption that it is desired to obtain an equal distribution of the luminance histogram but this objective has been contemplated solely by way of example. Consideration could accordingly be given to any other distribution entailing the need to compute a transfer function which is different from the cumulative distribution function.

To this end, computation of the transfer parameters can be carried out by means of a function f(x) for weighting the distribution function G(x). It is possible in particular to provide a device in which the function f(x) is computed in accordance with the law $f(x) = \frac{1}{2}x + \frac{1}{2}G(x)$. The variations of the function f(x) are thus greater than those of G(x) within the low-variation zones, thereby producing an increase in the gain transfer parameter within these zones and an improvement in the conditions of vision in these luminance zones.

In an alternative embodiment of the device hereinabove described, the non-linearity of the synthesizer is taken into account in the calculation of the transfer parameters for effecting the necessary corresponding correction. There can also be provided a manual control element which is inserted within the means 6 for controlling the transfer parameters and obtaining visual effect according to the producer's requirements.

It is within the capacity of anyone versed in the art to devise a method for computing transfer parameters by means of the microcomputer 15 such as, for example, the least squares method.

The means 4 for computing the luminance amplitude distribution as described in the foregoing have involved the use of wired logic but a microcomputer is wholly suited to a computing operation of this type.

The same applies to computation of the cumulative distribution function since the computing means 5 can be constituted by a microcomputer.

Finally, a digital memory can be employed in order to obtain the desired transfer function. In this case, the video analog signal $V_e$ is converted to digital values which are applied to the address inputs of the memory 15 which has previously been loaded by the microcomputer with the values of the transfer function. The output of the memory drives a digital-to-analog converter which delivers the video signal $V_s$.

It will readily be apparent that the device hereinabove described can be inserted in a video system from any video source.

What is claimed is:

1. A device for automatically controlling the transfer function of a video system for improving image perception, comprising:
    means for acquisition of the luminance distribution function of an image by statistical analysis of the values of samples of a video signal, sampled at a frequency greater then ten percent of the maximal frequency of the video signal, said means having one input for receiving the video signal and an output;
    means for computing the luminance cumulative distribution function of the image, having one input coupled to the output of the means for acquisition of the luminance distribution function, and an output;
    an analog non-linear four-terminal network having an input for receiving the video signal, an output for delivering a corrected video signal, and n control inputs for controlling the values of n parameters defining the transfer function of the four terminal network, n being a positive whole number;
    means for computing the values of the parameters as a function of the luminance cumulative distribution function so as to ensure that the corrected video signal extends over the entire scale of luminances in a predetermined distribution that enhances image details, having an input coupled to the output of said means for computing the cumulative distribution function, and n outputs coupled to the n control inputs of the four-terminal network for supplying the values of the n parameters, said values being constants for one image field, at least.

2. A device for automatically controlling the transfer function of a video system according to claim 1, wherein said means for acquisition of the luminance distribution comprise a sampler for the video signal, an analog-to-digital converter for the samples selected by the sampler and having one output, and means for computing the luminance distribution function having one input coupled to the output of the converter and one output coupled to the input of the means for computing the values of the parameters.

3. A device for automatically controlling the transfer function of a video system according to claim 2, wherein the means for computing the distribution function comprise a first memory having a data input, an addressing input coupled to the converter output, and an output coupled to the input of the means for computing the luminance cumulative distribution function, an adder, a second memory having an input coupled to the output of the first memory and an output coupled to the data input of the first memory through said adder.

4. A device for automatically controlling the transfer function of a video system according to claim 1, wherein the means for computing the luminance cumulative distribution function comprise an adder having a first input coupled to the output of the luminance distribution acquisition means, a second input and one output, a memory having an input coupled to the output of the adder and an output coupled to the second input of the adder and to the input of the means for computing the values of the parameters.

5. A device for automatically controlling the transfer function of a video system according to claim 1, wherein the means for computing the values of the parameters comprise a microcomputer having an input coupled to the output of the means for computing the luminance cumulative distribution function and an output for delivering the values of the parameters, and a memory having an input coupled to the output of the microcomputer and n outputs coupled to the n control inputs of the four-terminal network.

* * * * *